(12) United States Patent
Park

(10) Patent No.: US 10,775,477 B2
(45) Date of Patent: Sep. 15, 2020

(54) ANTENNA DEVICE AND VEHICLE RADAR DEVICE COMPRISING SAME

(71) Applicant: LG INNOTEK CO., LTD., Seoul (KR)

(72) Inventor: Bum Ki Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 370 days.

(21) Appl. No.: 15/762,980

(22) PCT Filed: Sep. 22, 2016

(86) PCT No.: PCT/KR2016/010600
§ 371 (c)(1),
(2) Date: Mar. 23, 2018

(87) PCT Pub. No.: WO2017/052238
PCT Pub. Date: Mar. 30, 2017

(65) Prior Publication Data
US 2018/0267139 A1    Sep. 20, 2018

(30) Foreign Application Priority Data
Sep. 24, 2015    (KR) .................. 10-2015-0135408

(51) Int. Cl.
*H01Q 21/08* (2006.01)
*G01S 7/03* (2006.01)
*H01Q 21/00* (2006.01)
*G01S 7/28* (2006.01)
*H01Q 13/20* (2006.01)
(Continued)

(52) U.S. Cl.
CPC .............. *G01S 7/032* (2013.01); *G01S 7/03* (2013.01); *G01S 7/2813* (2013.01); *G01S 13/87* (2013.01);
(Continued)

(58) Field of Classification Search
CPC .. H01Q 21/08; H01Q 21/0075; H01Q 21/293; H01Q 21/06; H01Q 1/3233;
(Continued)

(56) References Cited

U.S. PATENT DOCUMENTS 6,246,365 B1    6/2001    Tokoro
2006/0164294 A1    7/2006    Gottwald et al.
(Continued)

FOREIGN PATENT DOCUMENTS

JP    11-287857 A    10/1999
JP    2010-226165 A    10/2010
(Continued)

OTHER PUBLICATIONS

International Search Report in International Application No. PCT/KR2016/010600, filed Sep. 22, 2016.

*Primary Examiner* — Hoang V Nguyen
(74) *Attorney, Agent, or Firm* — Saliwanchik, Lloyd & Eisenschenk

(57) ABSTRACT

An antenna device according to an embodiment of the present invention comprises a plurality of antenna arrays, wherein the antenna array comprises: a power feeding part; and a plurality of radiators disposed to be spaced apart from the power feeding part, wherein the plurality of antenna arrays are alternately disposed from each other so that the spacing between the phase centers of the radiators is λ/2 or less.

20 Claims, 20 Drawing Sheets

(51) Int. Cl.
*G01S 13/87* (2006.01)
*G01S 13/931* (2020.01)
*H01Q 1/32* (2006.01)
*G01S 7/02* (2006.01)

(52) U.S. Cl.
CPC ......... *G01S 13/931* (2013.01); *H01Q 1/3233* (2013.01); *H01Q 13/206* (2013.01); *H01Q 21/0075* (2013.01); *H01Q 21/08* (2013.01); *G01S 2007/027* (2013.01); *G01S 2013/93271* (2020.01); *G01S 2013/93272* (2020.01)

(58) Field of Classification Search
CPC ...... H01Q 1/3283; H01Q 9/265; H01Q 13/08; G01S 7/032; G01S 13/87; G01S 13/931
See application file for complete search history.

(56) References Cited

U.S. PATENT DOCUMENTS

| | | | |
|---|---|---|---|
| 2010/0117913 A1 | 5/2010 | Jung | |
| 2015/0054712 A1 | 2/2015 | Milyakh et al. | |
| 2015/0255870 A1* | 9/2015 | Okunaga | H01Q 21/065 343/700 MS |

FOREIGN PATENT DOCUMENTS

| | | |
|---|---|---|
| JP | 2011-002277 A | 1/2011 |
| KR | 10-2008-0092218 A | 10/2008 |
| KR | 10-2010-0108810 A | 10/2010 |
| KR | 10-2013-0091993 A | 8/2013 |

* cited by examiner

| ex | Power | Phase |
|---|---|---|
| a1 | 1 | 0 |
| a2 | 1 | 180 |

| ex | Power | Phase |
|----|-------|-------|
| a1 | 1 | 0 |
| a2 | 1 | 0 |

| ex | Power | Phase |
|----|-------|-------|
| a1 | 1 | 0 |
| a2 | 0.2 | 90 |

| ex | Power | Phase |
|---|---|---|
| a1 | 0.2 | 90 |
| a2 | 1 | 0 |

ANTENNA DEVICE AND VEHICLE RADAR DEVICE COMPRISING SAME

CROSS-REFERENCE TO RELATED APPLICATIONS

This application is the U.S. national stage application of International Patent Application No. PCT/KR2016/010600, filed Sep. 22, 2016, which claims priority to Korean Application No. 10-2015-0135408, filed Sep. 24, 2015, the disclosures of each of which are incorporated herein by reference in their entirety.

TECHNICAL FIELD

The present invention relates to an antenna device and a vehicle radar device comprising the same, and more particularly, to an antenna device having a radiator structure for minimizing occurrence of side lobes, and a vehicle radar device comprising the same.

BACKGROUND ART

Radio detecting and ranging (RADAR) devices have been applied to various technical fields. The radar device is mounted on a vehicle to improve the running performance of the vehicle. Such radar devices use electromagnetic waves to detect information about a surrounding environment of the vehicle. In addition, as the information is used in running of the vehicle, the running performance of the vehicle can be improved. To this end, the radar device includes an antenna to transmit and receive electromagnetic waves.

Meanwhile, a vehicle radar may be classified into a long-range radar (LRR) and a short-range radar (SRR). The long-range radar may mainly use frequencies of a 77 GHz band. The short-range radar may mainly use a 24 GHz band.

In general array antennas, it is impossible to arrange a radiator within a half wavelength, which causes the occurrence of the side lobes.

DISCLOSURE

Technical Problem

An object of the present invention is to provide an antenna device in which a side lobe can be minimized by optimizing the arrangement of antenna channels, and a vehicle radar device comprising the same.

Technical Solution

According to an embodiment of the present invention, an antenna device includes a plurality of antenna arrays, wherein the antenna array includes a power feeding part and a plurality of radiators spaced apart from the power feeding part, and the antenna arrays are alternately arranged such that an interval between phase centers of the radiators is less than or equal to $\lambda/2$.

According to an embodiment of the present invention, a radar module includes an antenna device including a transmission antenna including antenna arrays configured as one channel and a reception antenna including antenna arrays configured as a plurality of channels, and a signal processing unit connected to the antenna device to process a transmission signal and a reception signal, wherein the antenna array includes a power feeding part and a plurality of radiators spaced apart from the power feeding part, and the antenna arrays are alternately arranged such that an interval between phase centers of the radiators is less than or equal to $\lambda/2$.

According to an embodiment of the present invention, a vehicle radar device includes a case and a printed circuit board accommodated in the case to mount an antenna device thereon, wherein the antenna device includes a plurality of antenna arrays, the antenna array includes a power feeding part and a plurality of radiators spaced apart from the power feeding part, and the antenna arrays are alternately arranged such that an interval between phase centers of the radiators is less than or equal to $\lambda/2$.

Advantageous Effects

According to an embodiment of the present invention, a radiation pattern in which side lobes are minimized is formed by adjusting a size and arrangement of radiators of a plurality of antenna arrays.

In addition, a radiation pattern having directivity of an antenna is formed by adjusting an input power and an input phase.

BEST MODE

Mode for Invention

Figure 1:
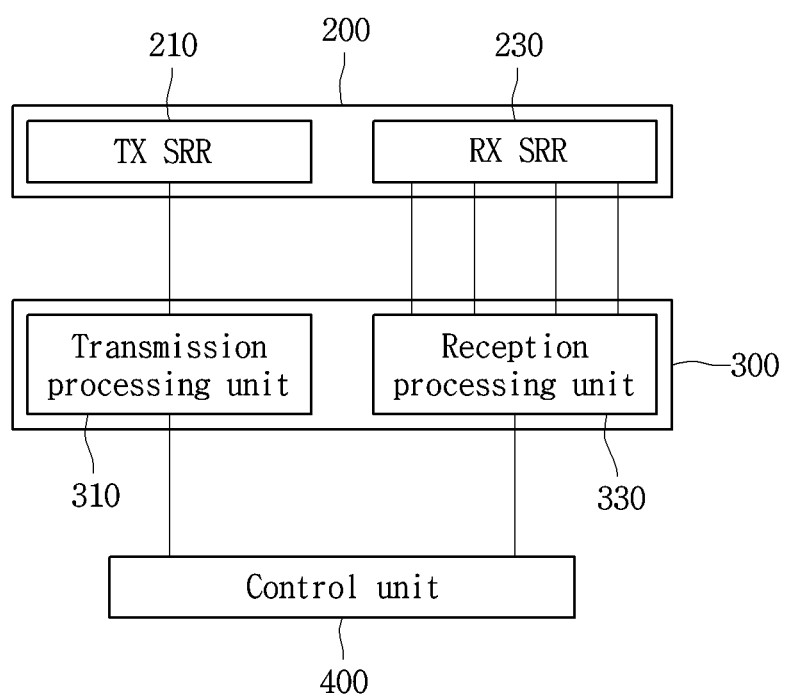
FIG. 1 is a block diagram showing an internal configuration of a radar module according to an embodiment of the present invention.

Hereinafter, an embodiment disclosed in the present specification will be described in detail with reference to the accompanying drawings, and, regardless of the reference numerals, the same or corresponding configuration elements will be assigned with the same reference numeral and overlapping description of the same will be omitted for simplicity. The suffixes "module" and "unit (or part)" that are mentioned in the elements used in the following description are merely used individually or in combination for the purpose of simplifying the description of the present invention. Therefore, the suffix itself will not be used to give a significance or function that differentiates the corresponding terms from one another. In addition, the detailed description of well-known features or functions will be ruled out in order not to unnecessarily obscure the gist of the embodiment disclosed in the present specification. In addition, the features of the embodiment disclosed in the present specification will be more clearly understood from the accompanying drawings and should not be limited by the accompanying drawings. It is to be appreciated that the spirit and technical scope of the present disclosure can encompass all changes, equivalents, and substitutes in addition to the attached drawings.

While terms including ordinal numbers, such as "first" and "second," etc., may be used to describe various components, such components are not limited by the above terms. The above terms are used only to distinguish one component from another.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The terms of a singular form may include plural forms unless otherwise specified.

In the present disclosure, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

FIG. 1 is a block diagram showing an internal configuration of a radar module according to an embodiment of the present invention.

Referring to FIG. 1, a radar module 100 may include an antenna device 200, a signal processing unit 300, and a control unit 400.

The radar module 100 may perform a function of detecting a motion of an object in a peripheral region of a current position. In other words, the radar module 100 may detect information about a surrounding environment through electromagnetic waves. The radar module 100 may detect movement of the object by detecting the motion of the object.

The antenna device 200 may include a transmission antenna unit 210 and a reception antenna unit 230. The transmission antenna unit 210 may be referred to as a transmission short-range radar (TX SRR). The reception antenna unit 230 may be referred to as a reception short-distance radar (RX SRR).

The antenna device 200 performs a wireless transmission/reception function of the radar module 100. In other words, the antenna device 200 may transmit a transmission signal to an air. In addition, the antenna device 200 may receive a reception signal from the air. In this case, the transmission signal represents a wireless signal transmitted from the radar module 100. In addition, the reception signal represents a wireless signal that is inputted to the radar module 100 as the transmission signal is reflected by a target.

The transmission antenna unit 210 may transmit the transmission signal to the air. The reception antenna unit 230 may receive the reception signal from the air. In the embodiment, the transmission antenna unit 210 and the reception antenna unit 230 may be short-range antennas, but embodiments are not limited thereto.

The signal processing unit 300 may perform a wireless processing function of the radar module 100. In this case, the signal processing unit 300 may process the transmission signal and the reception signal. The signal processing unit 300 may include a transmission processing unit 310 and a reception processing unit 330.

The transmission processing unit 310 may generate the transmission signal from transmission data. The transmission processing unit 310 may output the transmission signal to the transmission antenna unit 210. The transmission processing unit 310 may include an oscillation unit (not shown). The oscillation unit may include a voltage controlled oscillator (VCO) and an oscillator.

The reception processing unit 330 may receive the reception signal from the reception antenna unit 230. The reception processing unit 330 may generate reception data from the reception signal. The reception processing unit 330 may include a low-noise amplifier (LNA; not shown) and an analog-to-digital converter (ADC; not shown). The low-noise amplifier may perform low-noise amplification on the reception signal. The analog-to-digital converter may convert the reception signal, which is an analog signal, into digital data to generate the reception data.

The control unit 400 may drive the radar module 100. The control unit 400 may drive the radar module 100 while the vehicle is running. The control unit 400 controls the radar module 100 to determine whether an object is detected in the peripheral region of the current position. The control unit 400 may process the transmission data and the reception data. The control unit 400 may control the transmission processing unit 310 to generate the transmission signal from the transmission data. The control unit 400 controls the reception processing unit 330 to generate the reception data from the reception signal. The control unit 400 may synchronize the transmission data with the reception data. The control unit 400 may perform a constant false alarm rate (CFAR) operation, a tracking operation, a target selection operation, and the like to extract angle information, speed information, and distance information about the target.

Figure 2:
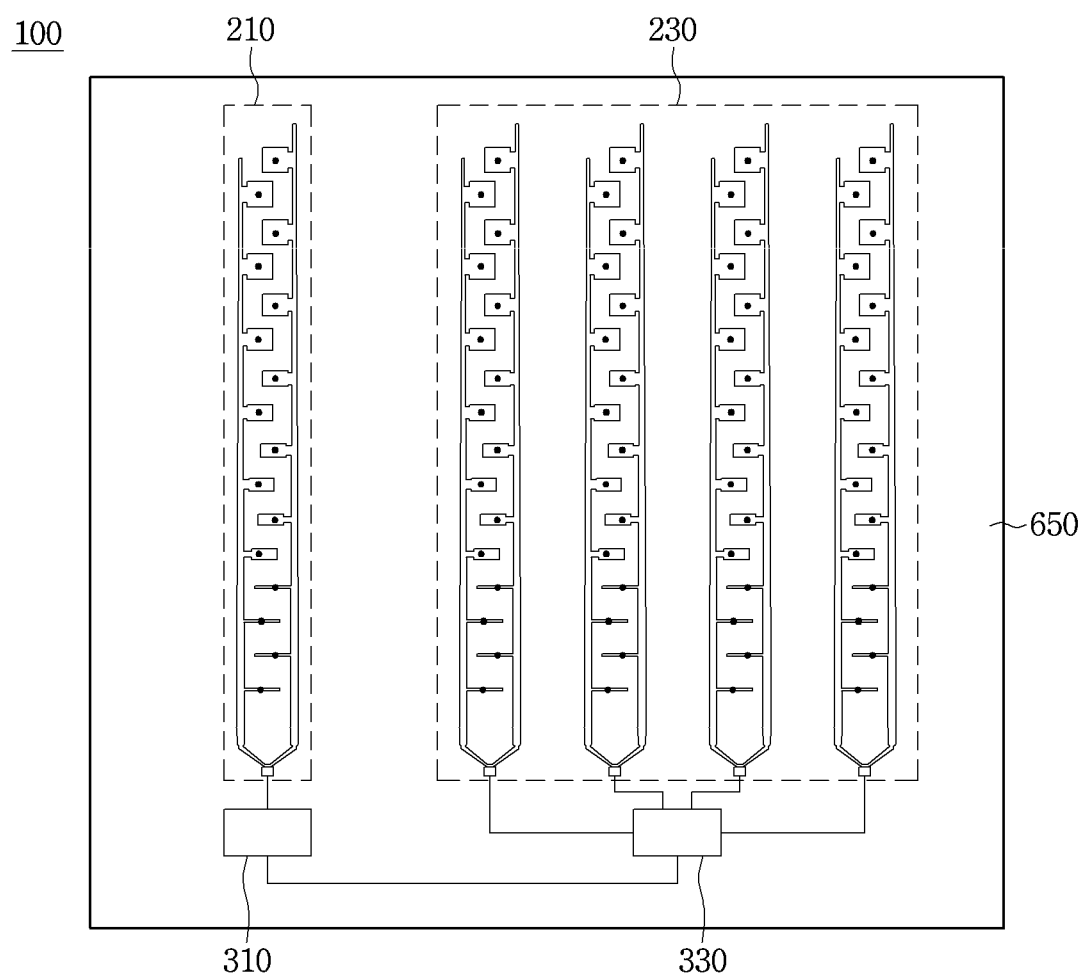
FIG. 2 is a plan view showing the radar module according to an embodiment of the present invention.

FIG. 2 is a plan view showing the radar module according to an embodiment of the present invention.

Referring to FIG. 2, in the radar module 100, the transmission antenna unit 210 including a plurality of arrays, the reception antenna unit 230 including a plurality of channels composed of a plurality of arrays, the transmission processing unit 310 for processing a signal of the transmission antenna unit 210, and the reception processing unit 330 for processing a signal of the reception antenna unit 230 may be mounted on a printed circuit board 650.

The transmission processing unit 310 may be connected to the transmission antenna unit 210 to output the transmission signal. The reception processing unit 330 may be connected to the reception antenna unit 230 to receive the reception signal. The arrangement of antennas of the transmission antenna unit 210 and the reception antenna unit 230 will be described in detail with reference to FIGS. 3 to 5.

Figure 3:
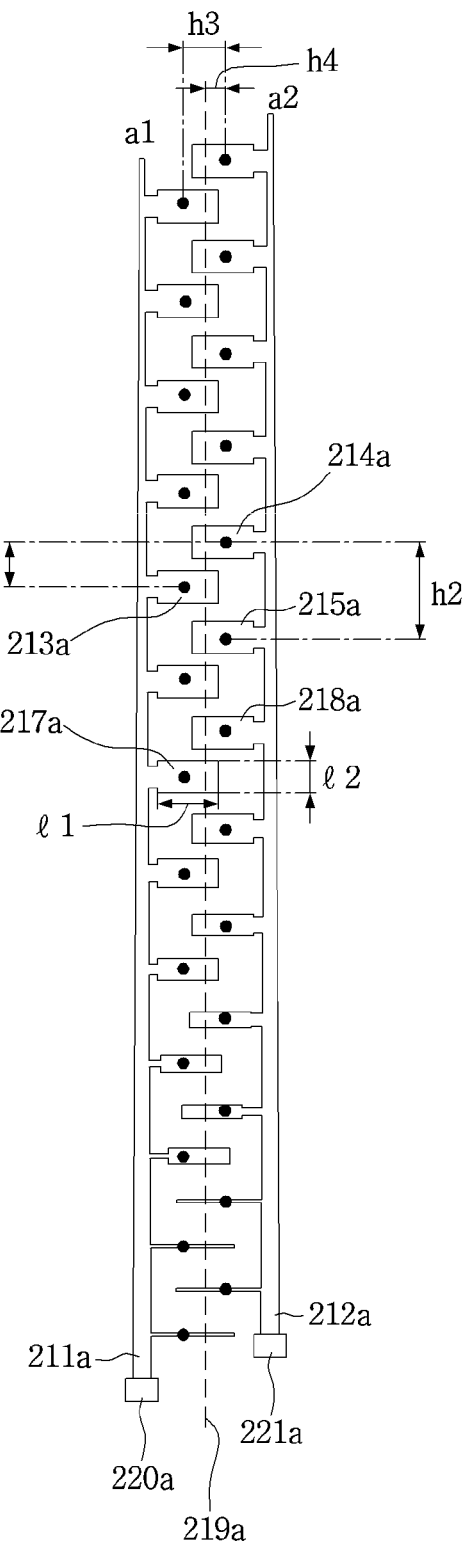
FIG. 3 is a plan view showing a transmission/reception antenna unit according to an embodiment of the present invention.

FIG. 3 is a plan view showing a transmission/reception antenna unit according to an embodiment of the present invention.

Referring to FIG. 3, the transmission/reception antenna unit 210a may include a plurality of arrays. For example, the transmission/reception antenna unit 210a may include a first array a1 and a second array a2.

The transmission/reception antenna unit 210a may include a power feeding part including a power feeding line and a power feed point, and a plurality of radiators. In the embodiment, the first array a1 may include a power feeding line 211a, a power feeding point 220a, and a plurality of radiators.

The power feeding line 211a may extend from the power feeding point 220a to supply a signal to the radiators. The power feeding lines 211a may extend in one direction and may be arranged side by side in another direction. The power feeding lines 211a may be spaced apart from each other at a predetermined interval. The signal may be transmitted from one end to an opposite end of the power feeding line 211a.

The power feeding point 220a is disposed at one end of the power feeding line 211a to supply a signal to the power feeding line 211a.

The radiators radiate a signal from the transmission/reception antenna unit 210a. The radiators form a radiation pattern of the transmission/reception antenna unit 210a. The radiators are distributed in the power feeding line 211a. The radiators are arranged along the power feeding lines 211a. Accordingly, a signal is supplied from the power feeding line 211a to radiators 213a and 217a. The radiators are formed of a conductive material. In this case, the radiators may include at least one of silver (Ag), palladium (Pd), platinum (Pt), copper (Gu), gold (Au), and nickel (Ni).

The second array a2 may include a power feeding line 212a, a power feeding point 221a, and a plurality of radiators.

In the transmission/reception antenna unit 210a according to the embodiment of the present invention, in order to form a radiation pattern that minimizes a side lobe, the first array a1 and the second array a2 may be alternately arranged such that an interval between phase centers of the radiators (center points in the radiator) arranged in the first array a1 and the second array a2 is less than or equal to λ/2. Referring to the side lobe, when energy of electric waves radiating from an antenna is distributed in various directions, a lobe defined in a direction in which radiation energy is maximized is referred to as a main lobe. Radiation defined in other directions is referred to as a minor lobe. The side lobe is a lobe radiating in an undesired direction. A side lobe level refers to a lobe level having a greatest power among the lobes radiating in the undesired direction. When side lobes radiating in a direction other than the direction of the main lobe are decreased in the horizontal direction patterns of antenna orientation, antenna efficiency is increased.

The transmission/reception antenna unit 210a according to an embodiment of the present invention may form a radiation pattern in which a beam width is expanded such that the side lobe is minimized by alternately arranging the radiators of the two arrays.

A typical antenna array may have side lobes. In the transmission/reception antenna unit according to an embodiment of the present invention, an interval between antenna patches is designed within a half wavelength such that there is no distinction between the main lobe and the side lobe, so that there is no boundary between the main lobe and the side lobe.

In other words, an interval h1 between the radiator 213a of the first array a1 and a radiator 214a of the second array a2 may be less than or equal to λ/2. An interval h2 between the radiator 214a and a radiator 215a of the second array may be less than or equal to λ. An interval h3 between a phase center of the radiator of the first array a1 and a phase center of the radiator of the second array a2 may be less than or equal to λ/2. In addition, an interval h4 between a center line 219a, which is defined between the first array a1 and the second array a2, and the phase center of the radiator may be less than or equal to λ/4 so as to minimize the side lobe.

In addition, a shape and a size of the radiator may vary from the power feeding point 220a to a center of the power feeding line 211a. For example, the radiator 217a disposed at a central portion of the power feeding line 211a may have a transverse width l1 narrower than a transverse width of a radiator adjacent to the power feeding point 220a, and a longitudinal width l2 wider than a longitudinal width of the radiator adjacent to the power feeding point 220a, so that the radiation is concentrated at the central portion of the power feeding line 211a, thereby minimizing the side lobe.

In the embodiment, the transmission/reception antenna unit 210a may be the short-range transmission antenna using the 24 GHz band, but embodiments are not limited thereto.

Figure 4:
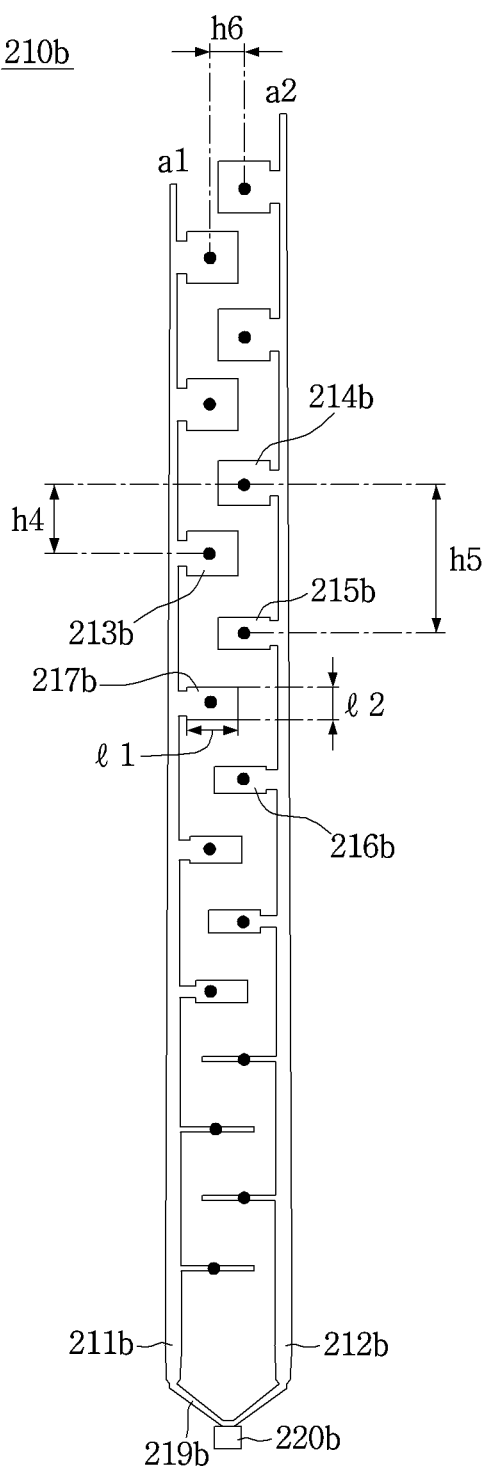
FIG. 4 is a plan view showing a transmission/reception antenna unit according to another embodiment of the present invention.

FIG. 4 is a plan view showing a transmission/reception antenna unit according to another embodiment of the present invention.

Referring to FIG. 4, the transmission/reception antenna unit 210b may include a single channel composed of a plurality of arrays. For example, a first array a1 and a second array a2 may be included. The transmission/reception antenna unit 210b may include a power feeding part including a power feeding line and a power feeding point, and a plurality of radiators.

In the embodiment, the first array a1 may include a power feeding line 211b, a power feeding point 220b, and a plurality of radiators. The power feeding line 211b may extend from the power feeding point 220b to supply a signal to the radiators. The power feeding lines 211b may extend in one direction and may be arranged side by side in another direction. The power feeding lines 211b may be spaced apart from each other at a predetermined interval. The signal may be transmitted from one end to an opposite end of the power feeding line 211b. The power feeding point 220b is connected to the power feeding line 211b by a distribution part 219b to supply a signal to power feeding lines 211b and 212b.

The radiators radiate a signal from the transmission/reception antenna unit 210b. The radiators form a radiation pattern of the transmission/reception antenna unit 210b. The radiators are distributed in the power feeding line 211b. The radiators are arranged along the power feeding lines 211b. Accordingly, a signal is supplied from the power feeding line 211b to radiators 213b and 217b. The radiators are formed of a conductive material. In this case, the radiators may include at least one of silver (Ag), palladium (Pd), platinum (Pt), copper (Gu), gold (Au), and nickel (Ni). The second array a2 may include a power feeding line 212b, a power feeding point 221b, and a plurality of radiators.

In the transmission/reception antenna unit 210b according to the embodiment of the present invention, in order to form a radiation pattern that minimizes a side lobe, the first array a1 and the second array a2 may be alternately arranged such that an interval between phase centers of the radiators (center points in the radiator) arranged in the first array a1 and the second array a2 is less than or equal to $\lambda/2$.

In other words, an interval h4 between the radiator 213b of the first array a1 and a radiator 214b of the second array a2 may be less than or equal to $\lambda/2$. An interval h5 between the radiator 214b and a radiator 215b of the second array a2 may be less than or equal to $\lambda$. In addition, an interval h6 between a phase center of the radiator of the first array a1 and a phase center of the radiator of the second array a2 may be less than or equal to $\lambda/2$ so as to minimize the side lobe.

A shape and a size of the radiator may vary from the power feeding point 220b to centers of the power feeding lines 211b and 212b. For example, the radiator 217b disposed at a central portion of the power feeding line 211b may have a transverse width l1 narrower than a transverse width of a radiator adjacent to the power feeding point 220b, and a longitudinal width l2 wider than a longitudinal width of the radiator adjacent to the power feeding point 220b, so that the radiation is concentrated at the central portion of the power feeding line 211a, thereby minimizing the side lobe.

In the embodiment, the transmission/reception antenna unit 210b may be the short-range transmission antenna using the 24 GHz band, but embodiments are not limited thereto.

Figure 5:
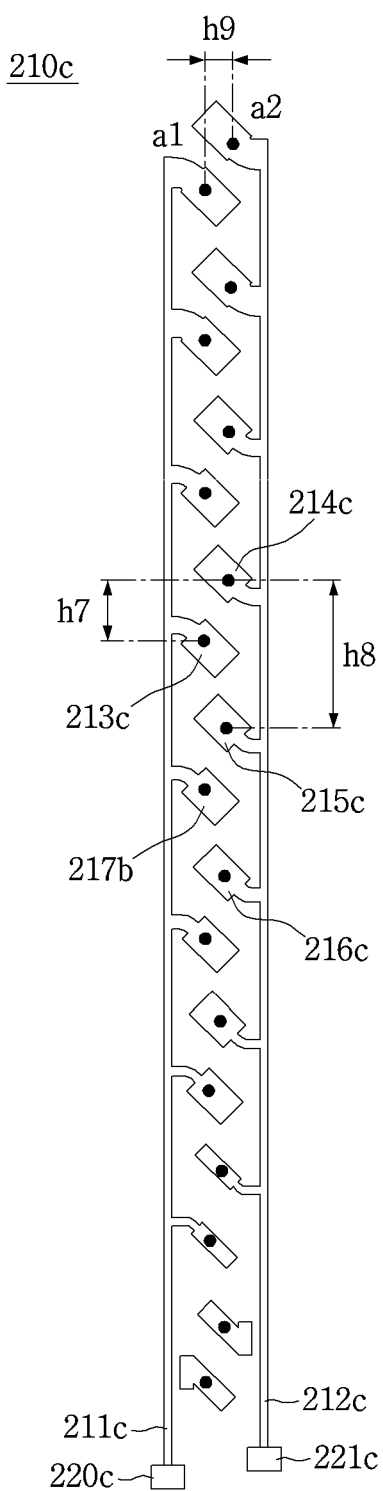
FIG. 5 is a plan view showing a transmission/reception antenna unit according to still another embodiment of the present invention.

FIG. 5 is a plan view showing a transmission/reception antenna unit according to still another embodiment of the present invention.

Referring to FIG. 5, a transmission/reception antenna unit 210c may include a plurality of arrays. For example, the transmission/reception antenna unit 210c may include a first array a1 and a second array a2.

The transmission/reception antenna unit 210c may include a power feeding part including a power feeding line and a power feed point, and a plurality of radiators. In the embodiment, the first array a1 may include a power feeding line 211c, a power feeding point 220c, and a plurality of radiators.

The power feeding line 211c may extend from the power feeding point 220c to supply a signal to the radiators. The power feeding lines 211c may extend in one direction and may be arranged side by side in another direction. The power feeding lines 211c may be spaced apart from each other at a predetermined interval. The signal may be transmitted from one end to an opposite end of the power feeding line 211c.

The power feeding point 220c is connected to one end of the power feeding line 211c to supply a signal to the power feeding line 211c.

The radiators radiate a signal from the transmission/reception antenna unit 210c. The radiators form a radiation pattern of the transmission/reception antenna unit 210c. The radiators are distributed in the power feeding line 211c. The radiators are arranged along the power feeding lines 211c. Accordingly, a signal is supplied from the power feeding line 211c to radiators 213c and 217c. The radiators are formed of a conductive material. In this case, the radiators may include at least one of silver (Ag), palladium (Pd), platinum (Pt), copper (Gu), gold (Au), and nickel (Ni).

The second array a2 may include a power feeding line 212c, a power feeding point 221c, and a plurality of radiators. In the transmission/reception antenna unit 210c according to the embodiment of the present invention, in order to form a radiation pattern that minimizes a side lobe, the first array a1 and the second array a2 may be alternately arranged such that an interval between phase centers of the radiators (center points in the radiator) arranged in the first array a1 and the second array a2 is less than or equal to $\lambda/2$.

In other words, an interval h7 between the radiator 213c of the first array a1 and a radiator 214c of the second array a2 may be less than or equal to $\lambda/2$. An interval h8 between the radiator 214c and a radiator 215c of the second array a2 may be less than or equal to $\lambda$. In addition, an interval h9 between a phase center of the radiator of the first array a1 and a phase center of the radiator of the second array a2 may be less than or equal to $\lambda/2$ so as to minimize the side lobe.

In the transmission/reception antenna unit 210c according to an embodiment, the radiators arranged at the power feeding line may be arranged at a predetermined angle. In addition, a shape and a size of the radiator may vary from the power feeding point 220c to a center of the power feeding line 211c. Further, the radiator adjacent to the power feeding point 220c is implemented as a gap-coupled patch, so that the radiation is concentrated at a central portion of the power feeding line 211c, thereby minimizing the side lobe.

In the embodiment, the transmission/reception antenna unit 210c may be the short-range transmission antenna using the 24 GHz band, but embodiments are not limited thereto.

Figure 6:
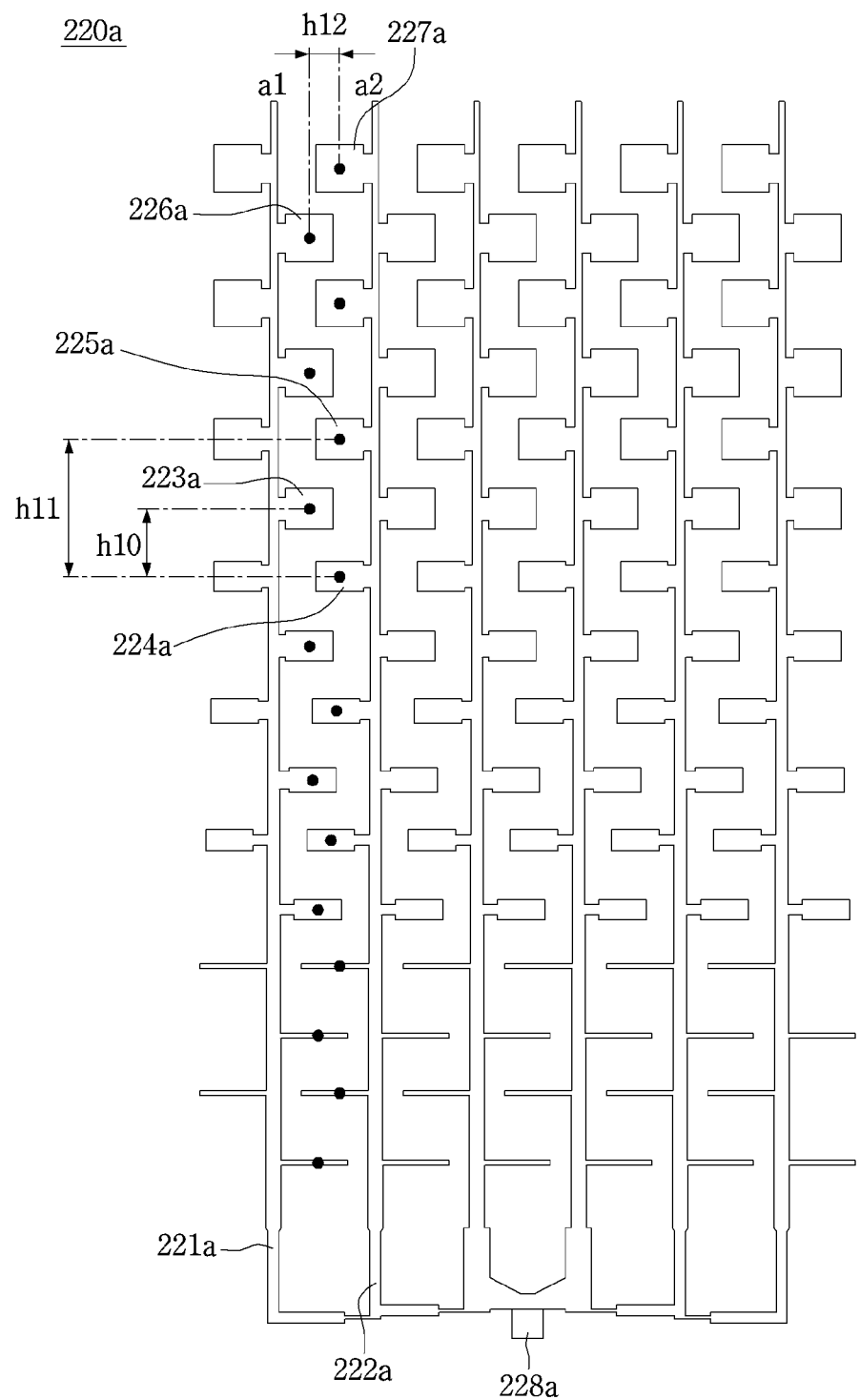
FIG. 6 is a plan view showing a transmission/reception antenna unit according to yet another embodiment of the present invention.

FIG. 6 is a plan view showing a transmission/reception antenna unit according to yet another embodiment of the present invention.

Referring to FIG. 6, a transmission/reception antenna unit 220a may include a single channel composed of a plurality of arrays. In addition, the transmission/reception antenna unit 220a may include a power feeding part including a power feeding line and a power feed point, and a plurality of radiators. In the embodiment, a first array a1 may include a power feeding line 221a, a power feeding point 228a, and a plurality of radiators.

The power feeding line 221a may extend from the power feeding point 228a to supply a signal to the radiators. The power feeding lines 221a may extend in one direction and may be arranged side by side in another direction. The power feeding lines 221a may be spaced apart from each other at a predetermined interval. The signal may be transmitted from one end to an opposite end of the power feeding line 221a.

The power feeding point 228a is connected to one end of the power feeding line 221a to supply a signal to the power feeding line 221a.

The radiators radiate a signal from the transmission/reception antenna unit 220a. The radiators form a radiation pattern of the transmission/reception antenna unit 220a. The radiators are distributed in the power feeding line 221a. The radiators are arranged along the power feeding lines 221a.

Unlike the embodiments shown in FIGS. 3 to 5, in the transmission/reception antenna unit 220a according to the embodiment of the present invention, a plurality of radiators of the transmission/reception antenna unit 220a are arranged on both sides of the power feeding line 221a.

A signal is supplied from the power feeding line 221a to radiators 233a and 226a. The radiators are formed of a conductive material. In this case, the radiators may include at least one of silver (Ag), palladium (Pd), platinum (Pt), copper (Gu), gold (Au), and nickel (Ni).

A second array a2 may include a power feeding line 222a, a power feeding point 228a, and a plurality of radiators.

In the transmission/reception antenna unit 220a according to the embodiment of the present invention, in order to form a radiation pattern that minimizes a side lobe, the first array a1 and the second array a2 may be alternately arranged such that an interval between phase centers of the radiators (center points in the radiator) arranged in the first array a1 and the second array a2 is less than or equal to λ/2.

In other words, an interval h10 between the radiator 223a of the first array a1 and a radiator 224a of the second array a2 may be less than or equal to λ/2. An interval h11 between the radiator 224a and a radiator 225a of the second array a2 may be less than or equal to λ. An interval h12 between a phase center of the radiator of the first array a1 and a phase center of the radiator of the second array a2 may be less than or equal to λ/2 so as to minimize the side lobe.

A size of the radiator may vary from the power feeding point 228a to center of the power feeding line 221a. For example, the radiator disposed at a central portion of the power feeding line 221a may have a transverse width l1 narrower than a transverse width of a radiator adjacent to the power feeding point 228a, and a longitudinal width l2 wider than a longitudinal width of the radiator adjacent to the power feeding point 228a, so that the radiation is concentrated at the central portion of the power feeding line 221a, thereby minimizing the side lobe.

In the embodiment, the transmission/reception antenna unit 210c may be the long-range transmission antenna using the 77 GHz band, but embodiments are not limited thereto.

Figure 7:
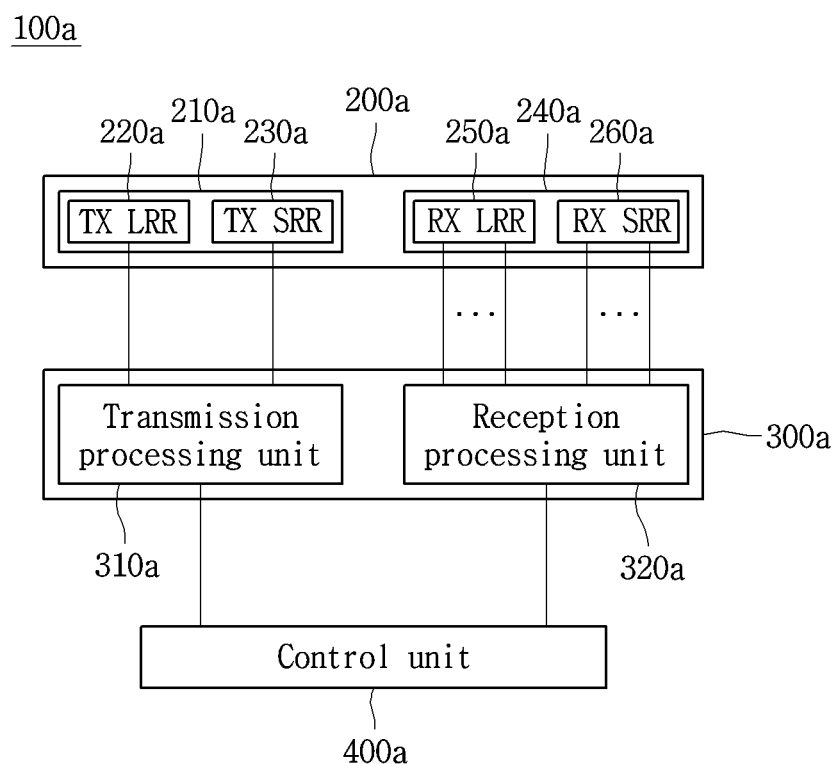
FIG. 7 is a block diagram showing an internal configuration of a multi-mode radar module according to another embodiment of the present invention.

FIG. 7 is a block diagram showing an internal configuration of a multi-mode radar module according to another embodiment of the present invention.

Referring to FIG. 7, a radar module 100a may include an antenna device 200a, a signal processing unit 300a, and a control unit 400a. The embodiment of FIG. 7 is different from the embodiment of FIG. 1 only in the antenna device 200a, so a description of the same configuration will be omitted.

The antenna device 200a may include a transmission antenna unit 210a and a reception antenna unit 240a. The transmission antenna unit 210a may include a long-range transmission antenna unit 220a and a short-range transmission antenna unit 230a. The reception antenna unit 230a may include a long-range reception antenna unit 250a and a short-range reception antenna unit 260a.

The antenna device 200a performs a wireless transmission/reception function of the radar module 100a. In other words, the antenna device 200a may transmit a transmission signal to an air. In addition, the antenna device 200a may receive a reception signal from the air. In this case, the transmission signal represents a wireless signal transmitted from the radar module 100a. In addition, the reception signal represents a wireless signal that is inputted to the radar module 100a as the transmission signal is reflected by a target.

The transmission antenna unit 210a may transmit a transmission signal to the air. The transmission antenna unit 210a may include a long-range transmission antenna unit 220a configured as a single channel and a short-range transmission antenna unit 230a configured as a single channel.

The reception antenna unit 230a may receive a reception signal from the air. The reception antenna unit 230a may include a long-range reception antenna unit 250a configured as multiple channels and a short-range reception antenna unit 260a configured as multiple channels.

Figure 8:
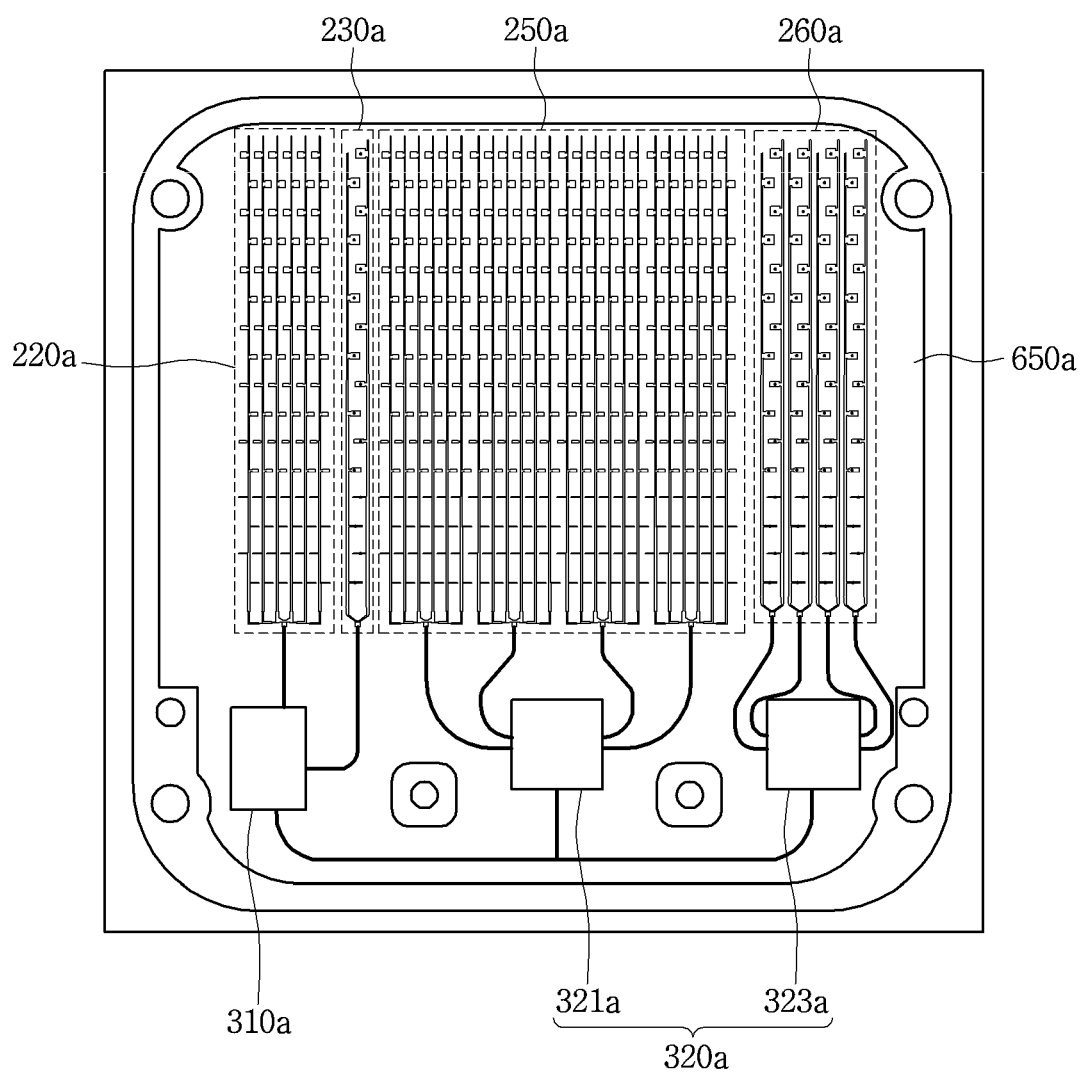
FIG. 8 is a plan view showing the multi-mode radar module according to another embodiment of the present invention.

FIG. 8 is a plan view showing the multi-mode radar module according to another embodiment of the present invention.

Referring to FIG. 8, in the radar module 100a, the long-range transmission antenna unit 220a and the short-range transmission antenna unit 230a including a plurality of arrays, the long-range reception antenna unit 250a and the short-range reception antenna unit 260a including a plurality of arrays and a plurality of channels, a transmission processing unit 310a for processing a signal of the long-range transmission antenna unit 220a and the short-range transmission antenna unit 230a, and a reception processing unit 320a for processing a signal of the long-range reception antenna unit 250a and the short-range reception antenna unit 260a may be mounted on a printed circuit board 650a.

The short-range transmission antenna unit 230a may be disposed between the long-range transmission antenna unit 220a and the long-range reception antenna unit 250a. The long-range reception antenna unit 250a may be disposed between the short-range transmission antenna unit 230a and the short-range reception antenna unit 260a.

Lengths of the long-range transmission antenna unit 220a, the short-range transmission antenna unit 230a, the long-range reception antenna unit 250a, and the short-range reception antenna unit 260a may be the same.

The transmission processing unit 310a is connected to the long-range transmission antenna unit 220a and the short-range transmission antenna unit 230a to output the transmission signal. The transmission processing unit 310a may be connected to the reception processing unit 320a including a first reception processing unit 321a and a second reception processing unit 323a.

The first reception processing unit 321a is connected to the long-range reception antenna unit 250a to receive the reception signal. The second reception processing unit 323a is connected to the short-range reception antenna unit 260a to receive the reception signal. The first reception processing unit 321a may be disposed between the transmission processing unit 310a and the second reception processing section 323a.

Figure 9:
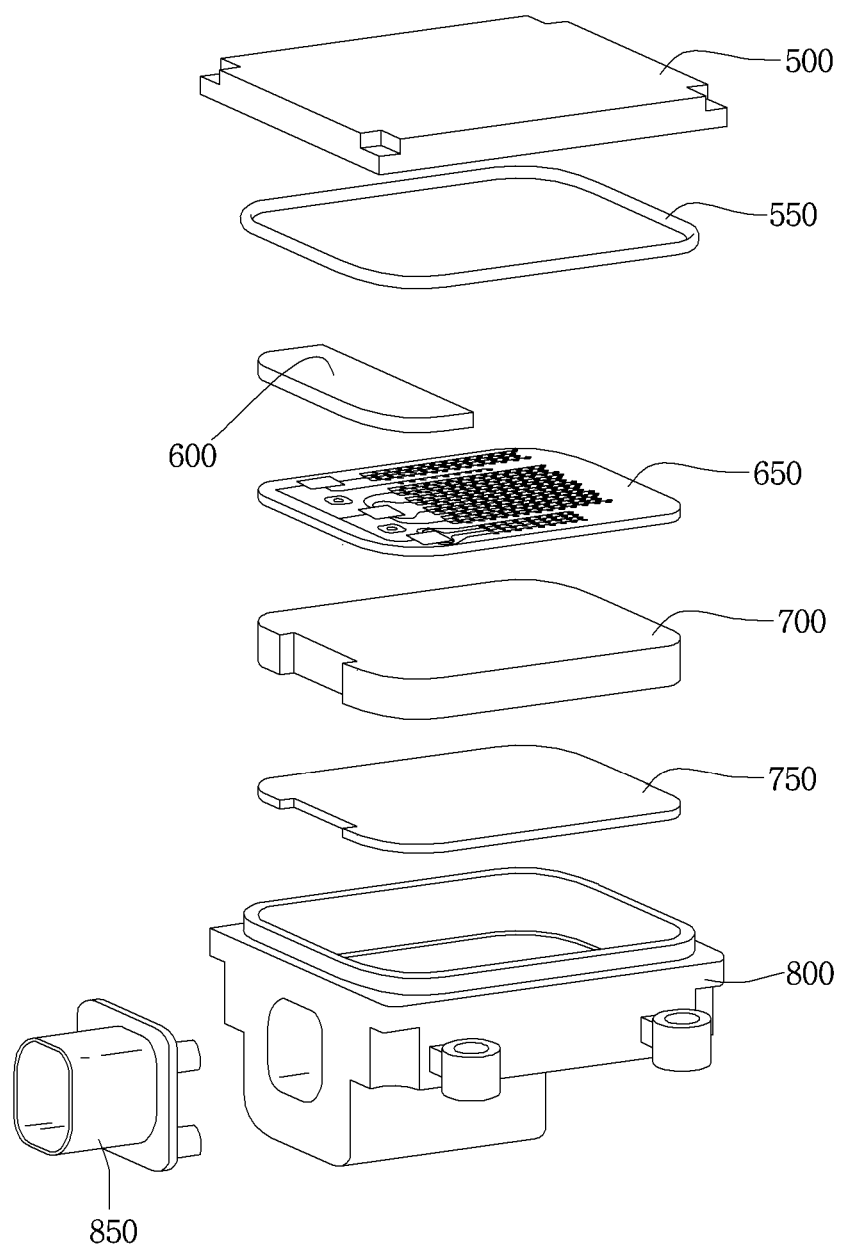
FIG. 9 is a perspective view showing a vehicle radar device according to an embodiment of the present invention.

FIG. 9 is a perspective view showing a vehicle radar device according to an embodiment of the present invention.

Referring to FIG. 9, a vehicle radar device 1000 may include a radome 500, a waterproof ring 550, a shielding part 600, a printed circuit board (PCB) 650, a bracket 700, an auxiliary printed circuit board 750, a case 800, and a connector 850.

The radome 500 may receive the printed circuit board 650 to protect the printed circuit board 650. The radome 500 may be fastened to the case 800. The radome 500 may be formed of a material that lowers electric wave attenuation. The radome 500 may be an electrical insulator.

The waterproof ring 550 may be disposed between the radome 500 and the case 800 to prevent the vehicle radar device 1000 from being immersed in water. For example, the waterproof ring 550 may be formed of an elastic material.

The shielding part 600 may shield a radio frequency (RF) signal generated from an integrated circuit (IC) chip of the printed circuit board 650. To this end, the shielding part 600 may be formed in a region corresponding to the IC chip of the printed circuit board 650.

A radar module including an antenna unit and a signal processing unit may be mounted on the printed circuit board 650. The antenna unit may include a plurality of wide-angle antennas arranged in one row, but embodiments are not limited thereto. The signal processing unit may be a millimeter wave RFIC, but embodiments are not limited thereto.

The bracket 700 may block noise generated during a signal processing process of the printed circuit board 650. A circuit for supplying a power and processing a signal may be mounted on the auxiliary printed circuit board 750, but embodiments are not limited thereto. The case 800 may receive the connector 850, the auxiliary printed circuit board 750, the bracket 700, the printed circuit board 650, and the shielding part 600.

The connector 850 may transmit and receive a signal between the vehicle radar device 1000 and an external device. For example, the connector 850 may be a controller area network (CAN) connector, but embodiments are not limited thereto.

Figures 10A, 10B:
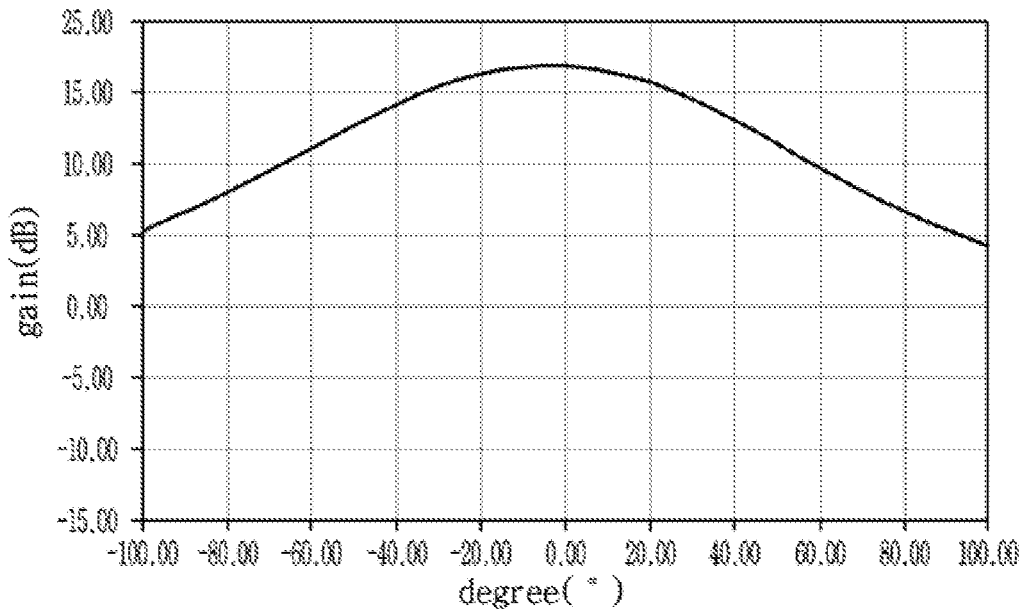
FIGS. 10A through 10C are radiation pattern graphs of a short-range antenna device according to an embodiment of the present invention.
Figures 10C, 11A:
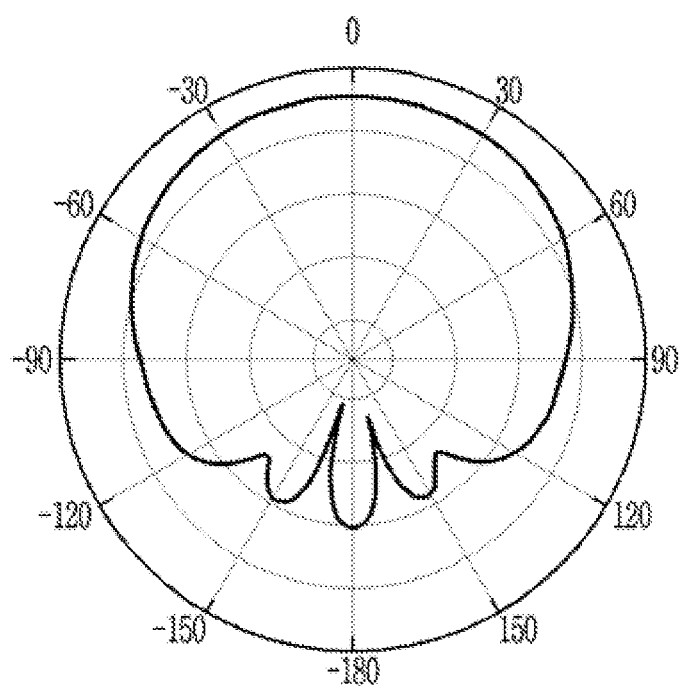
FIGS. 11A through 11C are radiation pattern graphs of a short-range antenna device according to another embodiment of the present invention.

FIGS. 10A through 10C are radiation pattern graphs of a short-range antenna device according to an embodiment of the present invention.

Referring to FIGS. 10A through 10C, there is shown a gain and a radiation pattern when mutually different powers and phases are inputted to the first array a1 and the second array a2 of the antenna device shown in FIG. 3.

FIG. 10A shows the power and the phase inputted to the first array a1 and the second array a2. FIG. 10B shows a gain according to the power and the phase. FIG. 10C shows a radiation pattern according to the power and the phase.

The ratio of the power distributed to the first array a1 and the second array a2 is 1:1, and a phase difference of 180 degrees may be applied. For example, a power of 1 W and a phase of 0 degree may be inputted to the first array a1. In addition, a power of 1 W and a phase of 180 degrees may be inputted to the second array a2. In this case, the antenna device may obtain a gain of about 15 dB, which is a peak value at 0 degree, and a gain of about 5 dB at −100 degrees and 100 degrees. In other words, an antenna having an antenna gain with a wide beam width can be implemented.

However, the ratio of the power and the phase distributed to the first array a1 and the second array a2 are not limited to the above embodiment. In an embodiment, the phase may be adjusted based on a signal received from a user input device of the vehicle (e.g., a steering wheel). In addition, the phase may be determined based on an angle of the steering wheel.

In the vehicle radar device according to an embodiment of the present invention, the power inputted to the first array a1 may be identical to the power inputted to the second array a2, and the phase inputted to the first array a1 may be different from the phase inputted to the second array a2 by 90 degrees. In other words, referring to FIG. 10C, the antenna device may have a radiation pattern radiating frontward without being biased to the left and right by inputting the above power and phase.

Figure 11B:
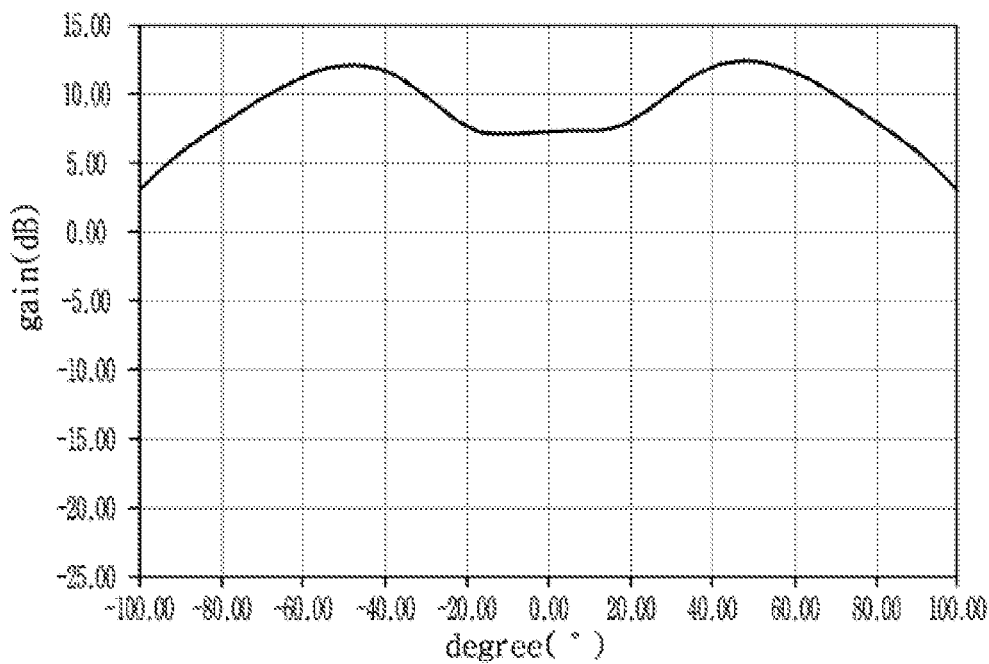
Figures 11C, 12A:
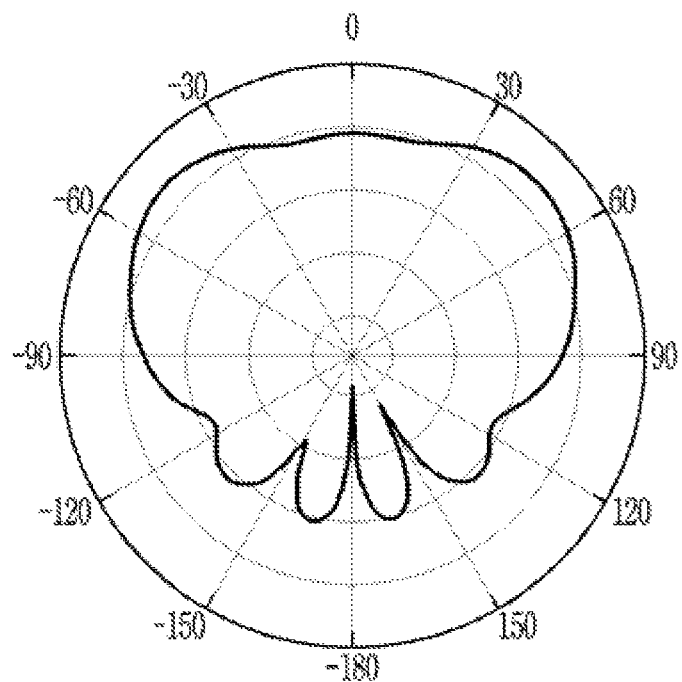
FIGS. 12A through 12C are radiation pattern graphs of the short-range antenna device according to another embodiment of the present invention.

FIGS. 11A through 11C are radiation pattern graphs of a short-range antenna device according to another embodiment of the present invention.

Referring to FIGS. 11A through 11C, there is shown a radiation pattern when mutually different powers and phases are inputted to the first array a1 and the second array a2 of the antenna device shown in FIG. 3.

FIG. 11A shows the power and the phase inputted to the first array a1 and the second array a2. FIG. 11B shows a gain according to the power and the phase. FIG. 11C shows a radiation pattern according to the power and the phase. For example, a power of 1 W and a phase of 0 degree may be inputted to the first array a1. In addition, a power of 1 W and a phase of 0 degree may be inputted to the second array a2. In this case, the antenna device may obtain a peak value of about 13 dB at −50 degrees and +50 degrees, and a gain of about 7.5 dB at 0 degree. Further, referring to FIG. 11C, it is possible to form a pattern in which the frontward radiation is reduced in comparison with FIG. 10C. In the vehicle radar device of the embodiment, the power and the phase inputted to the first array a1 may be identical to the power and the phase inputted to the second array a2.

In other words, according to the embodiment of the present invention, the vehicle radar device may control the detection direction based on the power and phase inputted to the first array a1 and the second array a2. In addition, the vehicle radar device may control the power and phase inputted to the first array a1 and the second array a2 to implement an antenna device having a maximum gain at −50 degrees and +50 degrees.

Figure 12B:
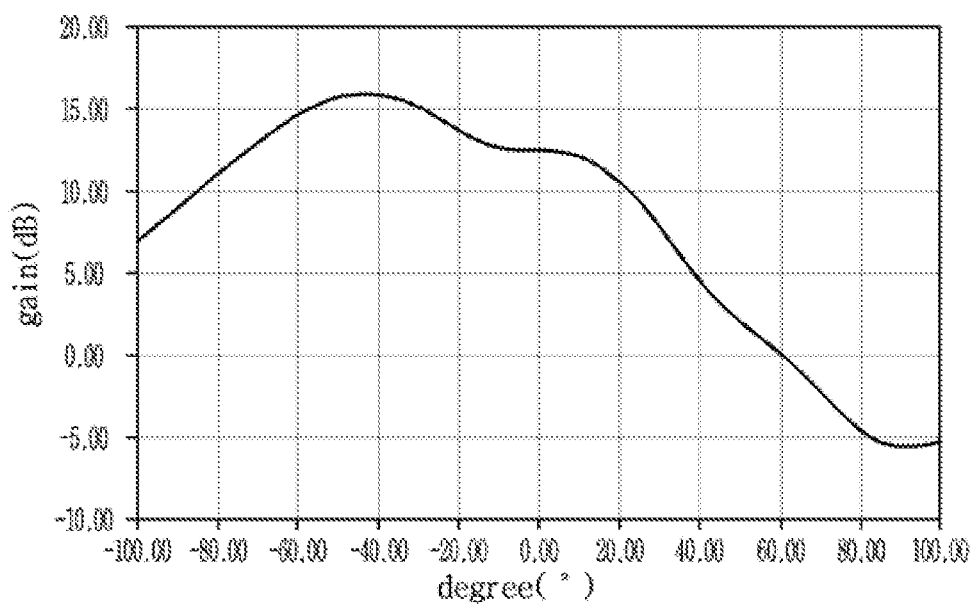
Figures 12C, 13A:
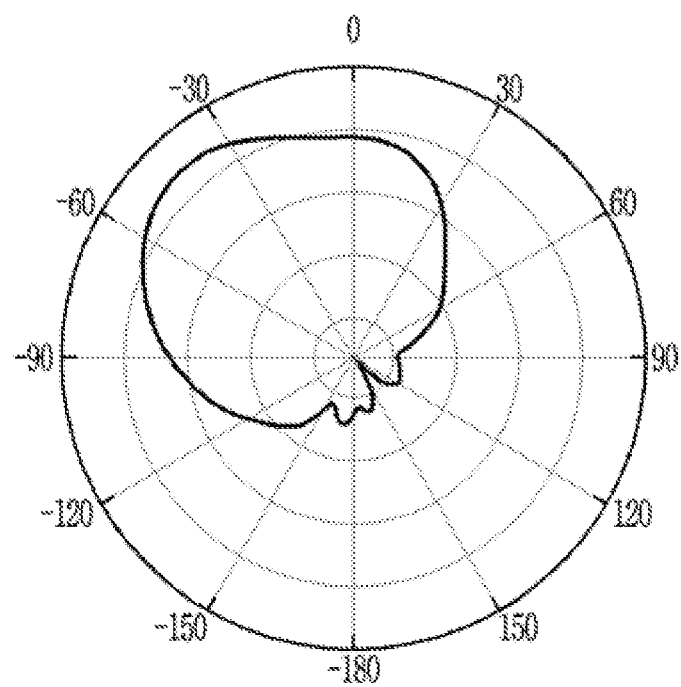
FIGS. 13A through 13C are radiation pattern graphs of a short-range antenna device according to still another embodiment of the present invention.

FIGS. 12A through 12C are radiation pattern graphsF of the short-range antenna device according to another embodiment of the present invention.

Referring to FIGS. 12A through 12C, there is shown a radiation pattern when mutually different powers and phases are inputted to the first array a1 and the second array a2 of the antenna device shown in FIG. 3.

FIG. 12A shows the power and the phase inputted to the first array a1 and the second array a2. FIG. 12B shows a gain according to the power and the phase. FIG. 12C shows a radiation pattern according to the power and the phase. In other words, according to the embodiment of the present invention, the vehicle radar device may control the detection direction based on the power and phase inputted to the first array a1 and the second array a2. For example, a power of 1 W and a phase of 0 degree may be inputted to the first array a1. In addition, a power of 0.2 W and a phase of 90 degrees may be inputted to the second array a2. In this case, the antenna device may obtain a gain of about 15 dB, which is a peak value at −50 degrees.

In other words, according to the embodiment of the present invention, the vehicle radar device may control the power and the phase inputted to the first array a1 and the second array a2 to implement an antenna device having a maximum gain at −50 degrees. In addition, referring to FIG. 12C, the radiation pattern of the vehicle radar device may be formed mainly in the left direction in comparison with FIG. 11C.

Figure 13B:
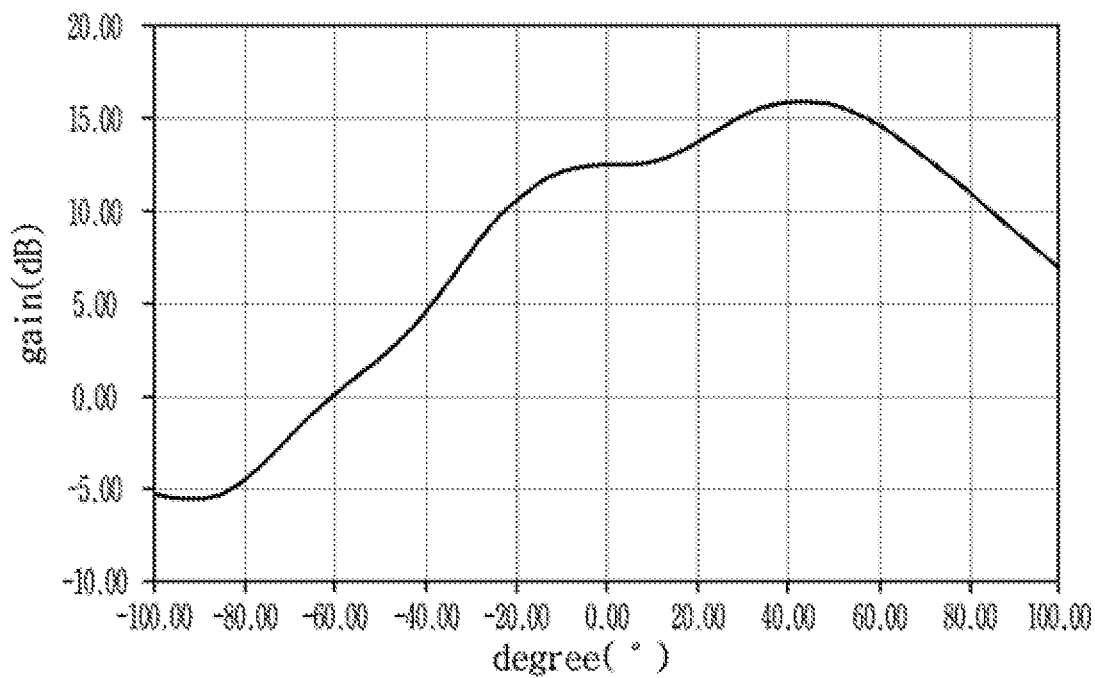
Figure 13C:
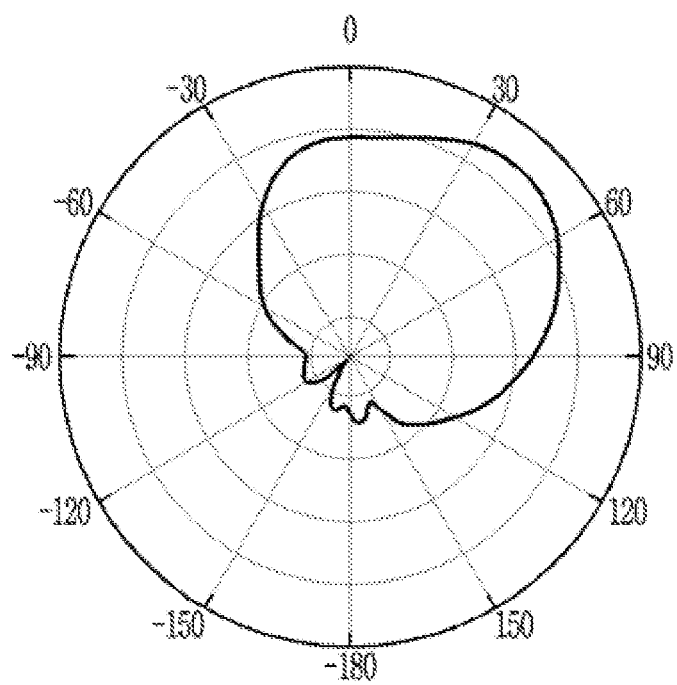

FIGS. 13A through 13C are radiation pattern graphs of a short-range antenna device according to still another embodiment of the present invention.

Referring to FIGS. 13A through 13C, there is shown a radiation pattern when mutually different powers and phases are inputted to the first array a1 and the second array a2 of the antenna device shown in FIG. 3.

FIG. 13A shows the power and the phase inputted to the first array a1 and the second array a2. FIG. 13B shows a gain according to the power and the phase. FIG. 13C shows a radiation pattern according to the power and the phase. For example, a power of 0.2 W and a phase of 90 degrees may be inputted to the first array a1. In addition, a power of 1 W and a phase of 0 degree may be inputted to the second array a2. In this case, the antenna device may obtain a peak value of about 15 dB at +50 degrees. In other words, according to the embodiment of the present invention, the vehicle radar device may control the detection direction based on the power and phase inputted to the first array a1 and the second array a2. In the vehicle radar device, the power inputted to the first array a1 may be greater than the power inputted to the second array a2, and the phase inputted to the first array a1 may be different from the phase inputted to the second array a2 by 90 degrees.

In other words, the vehicle radar device may control the power and phase inputted to the first array a1 and the second array a2 to implement an antenna device having a maximum gain at −50 degrees and +50 degrees. In addition, referring to FIG. 13C, the radiation pattern of the vehicle radar device may be formed mainly in the right direction in comparison with FIG. 11C.

Figure 14A:
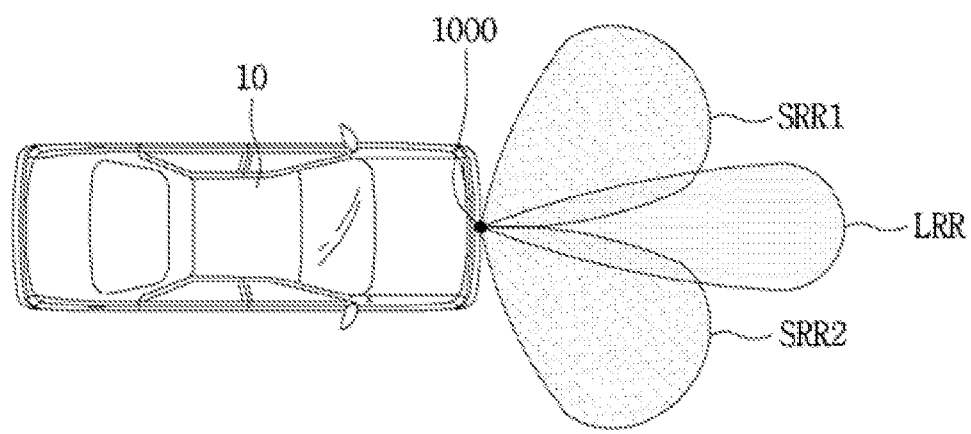
FIGS. 14A through 14C are radiation pattern graphs of a long-range antenna device and a short-distance according to an embodiment of the present invention.
Figure 14B:
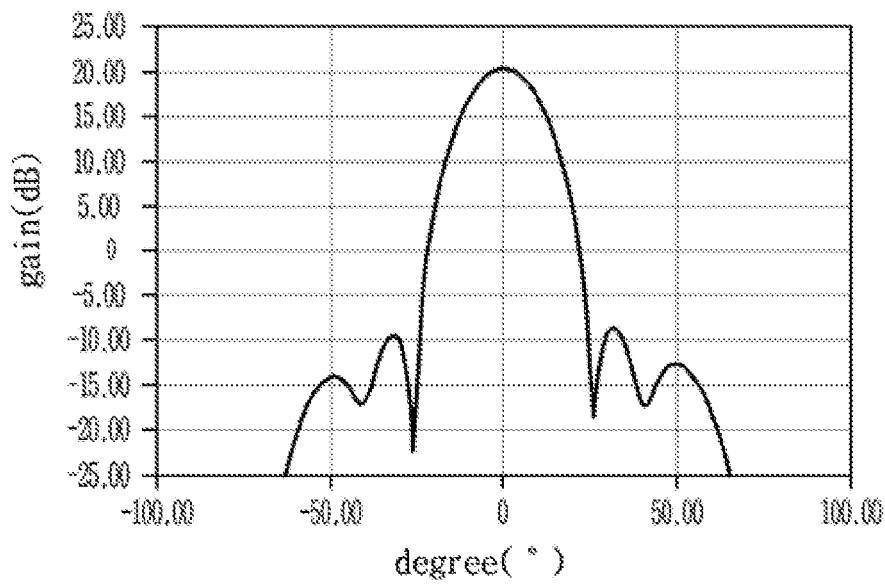
Figure 14C:
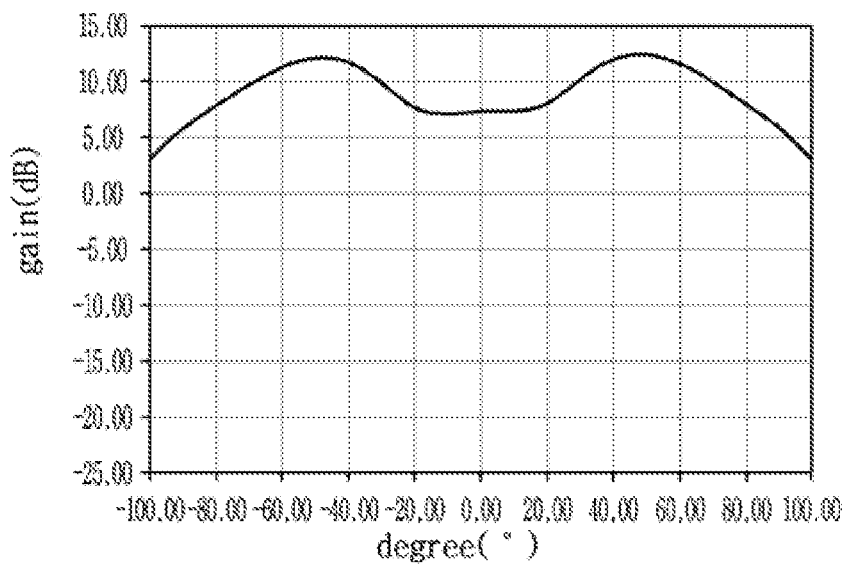

FIGS. 14A through 14C are radiation pattern graphs of a long-range antenna device and a short-distance according to an embodiment of the present invention.

FIG. 14A shows an embodiment in which a multi-mode vehicle radar device is mounted in the front of a vehicle 10. The multi-mode vehicle radar device is equipped with the multi-mode radar module shown in FIG. 8, and includes a long-range transmission/reception antenna and a short-range transmission/reception antenna. As shown in FIGS. 11A through 11C, a power of 1 W and a phase of 0 degree are inputted to the first array, and a power of 1 W and a phase of 0 degree are inputted to the second array, so that a left short-range region (SRR1) and a right short-range region (SRR2) can be detected by the short-range transmission/reception antenna, and a front long-range region (LRR) can be detected by the long-range transmission/reception antenna. FIG. 14B shows a gain of the long-range transmission/reception antenna of the multi-mode vehicle radar device. FIG. 14C shows a gain of the short-range transmission/reception antenna of the multi-mode vehicle radar device. According to an embodiment of the present invention, the vehicle radar device may perform detection by the long-range transmission/reception antenna and the short-range transmission/reception antenna in an overlapping manner.

Figure 15A:
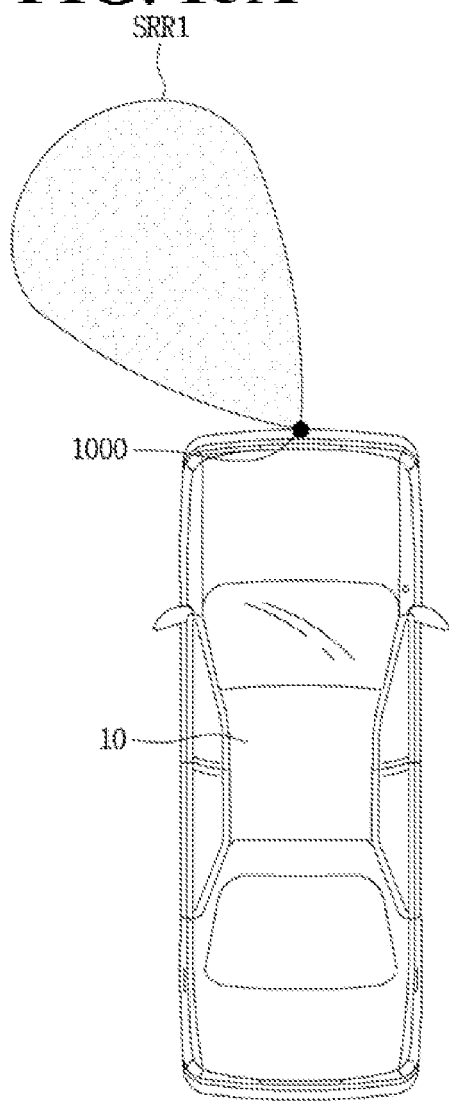
FIGS. 15A and 15B show a vehicle equipped with a vehicle radar according to an embodiment of the present invention.
Figure 15B:
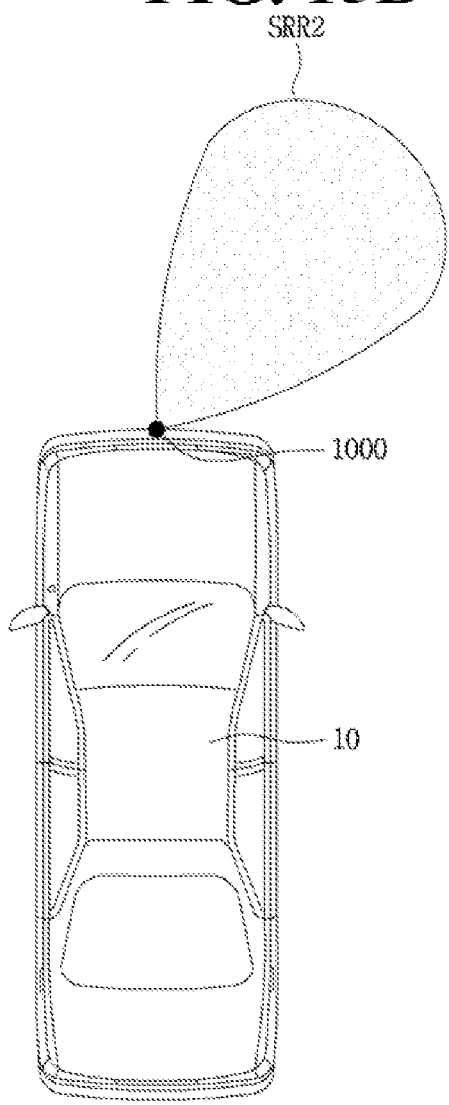

FIGS. 15A and 15B show a vehicle equipped with a vehicle radar according to an embodiment of the present invention.

FIGS. 15A and 15B show an embodiment in which a vehicle radar device including the short-range radar module of FIG. 2 is mounted in the front of the vehicle 10.

FIG. 15A shows that the vehicle radar device may input a power of 1 W and a phase of 0 degree to the first array as shown in FIGS. 12A through 12C. In addition, the vehicle radar device may input a power of 0.2 W and a phase of 90 degrees to the second array. In this case, the vehicle radar device may detect the left short-range region SRR1 more widely. In other words, when the vehicle 10 receives a control signal to move leftward from the user input device (e.g., the steering wheel), it is possible to detect the left short-range region SRR1 more widely by inputting the above power and phase to the vehicle radar device, so that visibility is ensured, thereby preventing accidents from occurring.

FIG. 15B shows that the vehicle radar device may input a power of 0.2 W and a phase of 90 degrees to the first array as shown in FIGS. 13A through 13C. In addition, the vehicle radar device may input a power of 1 W and a phase of 0 degree to the second array. In this case, the vehicle radar device may detect the right short-range region SRR2 more widely. In other words, when the vehicle 10 receives a control signal to move right ward from the user input device (e.g., the steering wheel), it is possible to detect the right short-range region SRR2 more widely by inputting the above power and phase to the vehicle radar device, so that visibility is ensured, thereby preventing accidents from occurring.

Figure 16A:
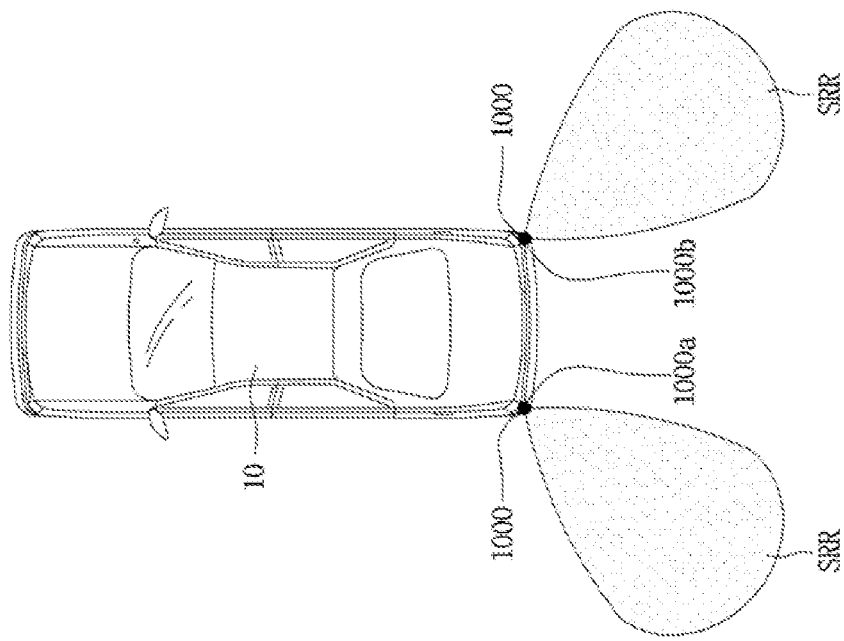
FIGS. 16A and 16B show a vehicle equipped with a vehicle radar according to another embodiment of the present invention.
Figure 16B:
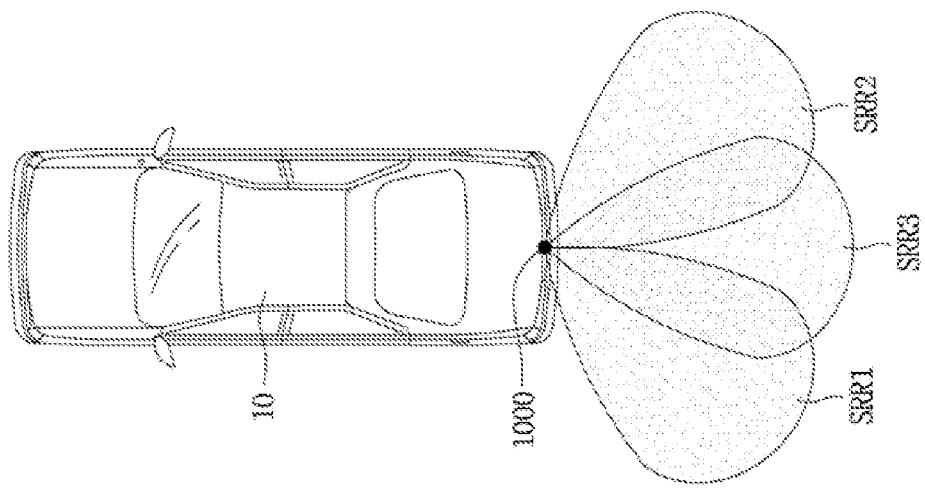

FIGS. 16A and 16B show a vehicle equipped with a vehicle radar according to another embodiment of the present invention.

FIG. 16A shows an embodiment in which a vehicle radar device including the short-range radar module of FIG. 2 is mounted at a rear central portion of the vehicle 10. FIG. 16B shows an embodiment in which a vehicle radar device including the short-range radar module of FIG. 2 is mounted on both sides of the rear of the vehicle 10.

Referring to FIG. 16A, the vehicle radar 1000 may widely detect a rear region SRR3 and lateral rear regions SRR1 and SRR2 by controlling the power and phase inputted to the antenna unit. Referring to FIG. 16B, vehicle radars 1000a and 1000b may widely detect the lateral rear region SRR by controlling the power and phase inputted to the antenna unit as shown in FIGS. 12A through 13C. In other words, the antenna device according to the embodiment of the present invention may be applied to a lateral rear vehicle radar, in which the radiation is concentrated in a specific direction and the side lobe is minimized by adjusting the input power and phase.

The above detailed description is to be considered illustrative, but is not to be construed as limiting in any ways. The scope of the present invention is to be determined by reasonable interpretation of the appended claims, and all changes within the scope of the present invention and equivalents thereof are included in the scope of the present invention.

INDUSTRIAL APPLICABILITY

The present invention can be applied to the fields of antenna and radar.

The invention claimed is:

1. An antenna device comprising:
   at least one power feeding point;
   a first power feeding line extending from the at least one power feeding point in a first direction;
   a second power feeding line spaced apart from the first power feeding line by a predetermined interval and extending from the at least one power feeding point in the first direction;
   a plurality of first radiators arranged on the first power feeding line in a second direction intersecting the first direction and spaced apart from each other by a predetermined interval in the first direction; and
   a plurality of second radiators arranged on the second power feeding line in the second direction and spaced apart from each other by a predetermined interval in the first direction,
   wherein a width of the first radiators is increased in the first direction and decreased in the second direction as the first radiators are progressively distanced from the power feeding point.

2. The antenna device of claim 1, wherein a spacing interval between the first radiators in the first direction is less than or equal to $\lambda$, and
   a spacing interval between the second radiators in the first direction is less than or equal to $\lambda$.

3. The antenna device of claim 1,
   wherein an interval between a center line, which is defined between the first power feeding line and the second power feeding line, and a phase center of each of the first radiators is less than or equal to $\lambda/4$, and
   an interval between the center line and a phase center of each of the second radiators is less than or equal to $\lambda/4$.

4. The antenna device of claim 1,
   wherein the first radiators are alternately arranged with the second radiators on the first power feeding line, and
   an interval between a phase center of each of the first radiators and a phase center of each of the second radiators is less than or equal to $\lambda/2$.

5. The antenna device of claim 4, wherein the first power feeding line and the second power feeding line are branched from a single identical power feeding point.

6. The antenna device of claim 1,
wherein a plurality of power feeding points are provided, and
wherein the first power feeding line and the second power feeding line extend from mutually different power feeding points.

7. The antenna device of claim 1,
wherein each of the first radiators includes a first portion overlapping with the second radiators about the first direction, and a second portion excluding the first portion, and
a width of the first portion is decreased as the first radiators are progressively distanced from the power feeding point.

8. A radar module comprising:
an antenna device including a transmission antenna configured as one channel and a reception antenna configured as a plurality of channels; and
a signal processing unit connected to the antenna device to process a transmission signal and a reception signal,
wherein each of antenna arrays configuring the transmission antenna and the reception antenna comprises:
at least one power feeding point;
a first power feeding line extending from the at least one power feeding point in a first direction;
a second power feeding line spaced apart from the first power feeding line by a predetermined interval and extending from the at least one power feeding point in the first direction;
a plurality of first radiators arranged on the first power feeding line in a second direction intersecting the first direction and spaced apart from each other by a predetermined interval in the first direction; and
a plurality of second radiators arranged on the second power feeding line in the second direction and spaced apart from each other by a predetermined interval in the first direction,
wherein a width of the first radiators is increased in the first direction and decreased in the second direction as the first radiators are progressively distanced from the power feeding point.

9. The radar module of claim 8,
wherein a spacing interval between the first radiators in the first direction is less than or equal to $\lambda$, and
a spacing interval between the second radiators in the first direction is less than or equal to $\lambda$.

10. The radar module of claim 8,
wherein an interval between a center line, which is defined between the first power feeding line and the second power feeding line, and a phase center of each of the first radiators is less than or equal to $\lambda/4$, and
an interval between the center line and a phase center of each of the second radiators is less than or equal to $\lambda/4$.

11. The radar module of claim 8,
wherein the first radiators are alternately arranged with the second radiators on the first power feeding line, and
an interval between a phase center of each of the first radiators and a phase center of each of the second radiators is less than or equal to $\lambda/2$.

12. A vehicle radar device comprising:
a case; and
a printed circuit board accommodated in the case to mount an antenna device thereon,
wherein the antenna device includes a plurality of antenna arrays,
the antenna array comprises:
at least one power feeding point;
a first power feeding line extending from the at least one power feeding point in a first direction;
a second power feeding line spaced apart from the first power feeding line by a predetermined interval and extending from the at least one power feeding point in the first direction;
a plurality of first radiators arranged on the first power feeding line in a second direction intersecting the first direction and spaced apart from each other by a predetermined interval in the first direction; and
a plurality of second radiators arranged on the second power feeding line in the second direction and spaced apart from each other by a predetermined interval in the first direction,
wherein a width of the first radiators is increased in the first direction and decreased in the second direction as the first radiators are progressively distanced from the power feeding point.

13. The vehicle radar device of claim 12,
wherein a spacing interval between the first radiators in the first direction is less than or equal to $\lambda$, and
a spacing interval between the second radiators in the first direction is less than or equal to $\lambda$.

14. The vehicle radar device of claim 12,
wherein an interval between a center line, which is defined between the first power feeding line and the second power feeding line and a phase center of each of the first radiators is less than or equal to $\lambda/4$, and
an interval between the center line and a phase center of each of the second radiators is less than or equal to $\lambda/4$.

15. The vehicle radar device of claim 12,
wherein the first radiators are alternately arranged with the second radiators on the first power feeding line, and
an interval between a phase center of each of the first radiators and a phase center of each of the second radiators is less than or equal to $\lambda/2$.

16. The vehicle radar device of claim 15,
wherein the first power feeding line and the second power feeding line are branched from a single identical power feeding point,
wherein a plurality of power feeding points are provided,
wherein the first power feeding line and the second power feeding line extend from mutually different power feeding points,
wherein each of the first radiators includes a first portion overlapping with the second radiators about the first direction, and a second portion excluding the first portion, and
wherein a width of the first portion is decreased as the first radiators are progressively distanced from the power feeding point.

17. The vehicle radar device of claim 12, wherein the first power feeding line and the plurality of first radiators configure a first antenna array,
wherein the second power feeding line and the plurality of second radiators configure a first antenna array,
wherein a detection direction is controlled based on a power and a phase inputted to the first array and the second array.

18. The vehicle radar device of claim 17,
wherein the power and the phase inputted to the first array and the second array are controlled based on an input signal received from a user input unit of the vehicle,
wherein the user input unit is a steering wheel, and
wherein the phase is controlled according to a steering angle of the steering wheel.

19. The vehicle radar device of claim 18,
wherein the power inputted to the first array is identical to the power inputted to the second array while the phase inputted to the first array is different from the phase inputted to the second array by 180 degrees when the steering angle is a first angle,
the power and the phase inputted to the first array are identical to the power and the phase inputted to the second array when the steering angle is a second angle, and
the power inputted to the first array is greater than the power inputted to the second array while the phase inputted to the first array is different from the phase inputted to the second array by 90 degrees when the steering angle is a third angle.

20. The vehicle radar device of claim 18,
wherein the antenna device includes a long-range transmission/reception antenna unit and a short-range transmission/reception antenna unit, and
wherein a length of an antenna array of the long-range transmission/reception antenna unit is equal to a length of an antenna array of the short-range transmission/reception antenna unit.

\* \* \* \* \*